US008329240B2

(12) United States Patent
Baechler et al.

(10) Patent No.: US 8,329,240 B2
(45) Date of Patent: Dec. 11, 2012

(54) MILK POWDER (75) Inventors: Robert Baechler, La Tour-De-Peilz (CH); François Morgan, Rennes (FR); Jean-Claude Gumy, Suchy (CH); Parvathi Sellappan, Lausannne (CH)

(73) Assignee: Nestec S.A., Vevey (CH)

( * ) Notice: Subject to any disclaimer, the term of this patent is extended or adjusted under 35 U.S.C. 154(b) by 492 days.

(21) Appl. No.: 11/773,532

(22) Filed: Jul. 5, 2007

(65) Prior Publication Data

US 2007/0286937 A1 Dec. 13, 2007

Related U.S. Application Data (63) Continuation of application No. PCT/EP2005/014090, filed on Dec. 22, 2005.

(30) Foreign Application Priority Data

Jan. 6, 2005 (EP) .................................... 05075020

(51) Int. Cl.
*A23C 9/00* (2006.01)

(52) U.S. Cl. ............................. 426/588; 426/583; 222/2

(58) Field of Classification Search .................. 426/588
See application file for complete search history.

(56) References Cited

U.S. PATENT DOCUMENTS

| 3,080,235 A * | 3/1963 | Hodson et al. ................. 426/588 |
| 6,048,565 A | 4/2000 | Getler et al. .................... 426/583 |
| 6,293,427 B1 * | 9/2001 | Cutting ............................. 222/2 |
| 6,335,045 B1 | 1/2002 | Peters et al. .................... 426/471 |
| 6,548,099 B1 | 4/2003 | Baker et al. .................... 426/588 |
| 2004/0208967 A1 | 10/2004 | Getler ........................... 426/492 |
| 2006/0088642 A1 | 4/2006 | Boersen et al. ............... 426/583 |

FOREIGN PATENT DOCUMENTS

| GB | 522054 | 7/1940 |
| GB | 534214 | 3/1941 |
| GB | 1 055424 | 1/1967 |
| WO | WO 97/35486 | 10/1997 |
| WO | WO 00/18249 | 4/2000 |
| WO | WO 02/087348 A1 | 11/2002 |
| WO | WO 2004/057973 A1 | 7/2004 |

* cited by examiner

*Primary Examiner* — Elizabeth Gwartney
(74) *Attorney, Agent, or Firm* — Winston & Strawn LLP (57) ABSTRACT

A method of improving the flow properties or cold solubility of a milk powder and use of the modified powder in beverage distribution machine for delivering, in particular, cold beverages. The method includes controlling glycation of proteins in the range of 10 to 35% blocked lysine and lactose crystallization between 5 and 50%. The resulting powder also represents an embodiment of the invention.

18 Claims, 6 Drawing Sheets

| Skim milk powder untreated | Heat-treated skim milk powder sample 2728 |

MILK POWDER

CROSS-REFERENCE TO RELATED APPLICATIONS

This application is a continuation of International application PCT/EP2005/014090 filed Dec. 22, 2005, the entire content of which is expressly incorporated herein by reference thereto.

FIELD OF THE INVENTION

The present invention relates to a milk powder, in particular to a modified milk powder having improved flow properties and/or improved solubility at room temperature and below, as well as to its use and a process for its production.

BACKGROUND OF THE INVENTION

Milk powders, such as skimmed milk powder and buttermilk powder, are used in a wide variety of foodstuffs including confectionery, infant formulas, bakery products, dry mixes (e.g. pancake or biscuit mixes, beverage mixes), soups, fermented milk products, ice cream and frozen dairy desserts, processed cheese, and meat products. Further, skimmed milk powder is often used in reconstituted (with water) or recombined (with water and fat) form, especially in places or circumstances where storage of fresh milk is difficult.

Two major constituents of milk powders are milk proteins and reducing sugars, primarily lactose. When milk proteins are heated in the presence of reducing sugars, free amino groups of the proteins will react with the sugars resulting in glycation of the proteins. If such reactions are allowed to proceed unchecked, the result can be a substantial reduction in nutritional value and some browning may also be observed. The complex series of reactions that can occur are known collectively as the Maillard reaction. Indeed, it is even thought that Maillard type reactions may occur, albeit very slowly, in food products containing the necessary chemical groups at room temperature. Although the Maillard reaction is generally thought of as undesirable and steps are therefore taken to control it during processing of the relevant foodstuffs, more recently it has been realized that carefully controlled glycation of milk proteins might offer the opportunity to manipulate the properties of the proteins in various ways.

The first irreversible product resulting from the non-enzymatic interaction of a glycosyl group and the α- or ε-amino groups of proteins is known as an Amadori compound. All Amadori compounds generate furosine when subjected to acid hydrolysis and accordingly a method of monitoring the progress of glycation of milk proteins based on measurement of furosine production was devised. With this tool and the subsequent development of mass spectrometry techniques, it became theoretically possible to monitor the progress of the Maillard reaction. Glycation can be carried out in solution or in the solid state. However, according to Morgan et al. (*Modification of bovine beta-lactoglobulin by glycation in a powdered state or in an aqueous solution: immunochemical characterization*, J Agric Food Chem (1999) 47, 4543-8), solid-state processes result in less conformational change of the protein molecule. Further, solid-state processes are easier to monitor and control.

International application WO 00/18249 describes a process for the solid-state glycation of powdered whey protein-containing materials comprising adjusting the water activity of the powder to 0.3 to 0.8 and allowing glycation to proceed at a temperature of 30 to 75° C. for between 1 hour and 80 days. It is claimed that the resulting powder has enhanced functional properties, such as enhanced heat stability, emulsifying activity, antioxidant activity and enterotoxin binding capacity.

Given the wide range of uses of milk powders described above, it can be seen that powders having different properties may be more effective for certain uses than others.

U.S. Pat. No. 6,548,099 relates to a process for crystallizing amorphous lactose in milk powder for preparing chocolate products. The process includes (a) contacting milk powder with water in an amount sufficient to initiate crystallization and (b) treating powder to heat and shear forces at a temperature above the wetted milk powder. The combination of shear and heat helps liberate the entrapped fat and therefore improves the rheological properties of milk, improves the texture and mouthfeel in the production of chocolate.

US published patent application 2004/0208967 relates to a method and system for converting liquid products into free-flowing powders with pre-cooling. The method includes the heating of the liquid product to a temperature above the crystallization of any component in the liquid product in a heat exchanger, subsequently flash separating volatile components from the heated liquid to obtain a paste concentrate, then, precooling a fraction of the paste concentrate and drying the combination of precooled and non-precooled concentrate.

An example of a common use of milk powders is as a constituent of dry beverage mixes which are delivered through vending machines. These beverages may be served hot or cold, and include coffee, tea, chocolate, soup and the like. For this purpose, it is desired that milk powders possess specific physical properties to avoid such problems as caking of the powder. For example, good flow properties allow for accurate dosing of the powder which results in an optimum taste in the resulting beverage and minimized powder wastage. Further, powders with improved solubility allow beverages to be dispensed more rapidly and the resulting beverages contain less undissolved powder.

With the increasing demand for cold beverages, the solubility of milk powders at low temperatures is also an issue. This is an obstacle to producing cold beverages from a beverage distribution machine. Solubility of milk powder can be improved by the addition of additives such as salts, wetting or surface-active agents. However, these agents are not always sufficiently effective and desirable. Therefore, there is a need for a milk powder that dissolves better and faster in cold water with less or even preferentially no additives.

One of the objectives of the present invention is to provide a modified milk powder having improved flow properties and/or improved solubility in cold water.

SUMMARY OF THE INVENTION

The invention relates to a modified milk powder with a degree of lactose crystallization between 5 and 50% wherein the powder comprises a controlled proportion of glycated proteins that results in unexpected improved solubility in cold water and/or unexpected improved flow properties as determined by a reduced angle of repose in a powder flow test, as compared to the non-modified powder. The degree of lactose crystallization can be controlled as described below, and can be measured by gas capillary chromatography analysis. The milk powder may be buttermilk powder, milk protein concentrate or semi-skimmed milk powder, but preferably the powder is skimmed milk powder. The modified powder comprises glycated proteins, preferably in the range of 10-35% blocked lysine. More preferably, the glycated proteins are in the range of 10 to 25% blocked lysine. Preferably there are no obvious differences in sensory analysis (taste, flavor perception) as compared to the unmodified powder.

Such a modified powder is well suited to use in beverage distribution machine or vending machines, such as machines dispensing instant coffee, soup and the like, and in other situations where rapid accurate dosing of the powder is required and/or rapid solubility of the powder is preferred. This results in an optimum taste in the resulting beverage and minimized wastage. Such powders are particularly useful if the beverage to be dispensed is a cold beverage, since the modified powder preferably shows improved solubility at low temperatures (e.g. 10° C.).

Preferably the degree of lactose crystallization is between 10 and 40%.

In a preferred embodiment the modified milk powder has improved flow properties such that the angle of repose in a powder flow test is less than 45°, more preferably less than 40°, and/or less than 15% of the powder remains in a canister and/or more than 50% of doses are within specification during a canister emptying test. In another preferred embodiment the modified milk powder has improved solubility in water at 20° C. such that maximum powder dissolution after 2 minutes is >95%. Preferably the powder also shows improved solubility at temperatures lower than room temperature, e.g. 10° C.

Further, the invention relates to a method for the crystallization of lactose in a milk powder comprising the steps of:
(a) adjusting the water activity of the powder to 0.15 to 0.7;
(b) heating the powder at a temperature of between 25° C. to 55° C., preferably between 30° C. and 45° C., above glass transition temperature (Tg) of the powder for 10 minutes to 6 hours, more preferably for 6 to 120 minutes, most preferably below 60 minutes, to achieve a degree of lactose crystallization of between 5 and 50%;
the combined effect of steps (a) and (b) being such as to provide a powder with improved solubility in cold water and/or improved flow properties as determined by a reduced angle of repose in a powder flow test, relative to the initial milk powder.

In a preferred embodiment, the method further comprises step (c):
(c) cooling and/or drying the product of step (b),
the combined effect of steps (a), (b) and (c) being such as to provide a powder with improved solubility at room temperature and/or improved flow properties as determined by a reduced angle of repose in a powder flow test, relative to the initial milk powder In this method, the powder may be skimmed milk powder, semi-skimmed milk powder, milk protein concentrate or buttermilk powder and, preferably, the resulting powder comprises proteins which are glycated, most preferably glycated in the range of 10-35% blocked lysine. Preferably, the proteins are glycated in the range of 10 to 25% blocked lysine. Indeed, the higher the proportion of heat induced glycation of proteins, the more the proteins are partially denatured; therefore potentially loosing their nutritive values without improving further the properties of solubility and flowability. Preferably the glycation process is a solid-state glycation process.

In another aspect the invention provides the use of a modified milk powder as described above in the production of a foodstuff, such as a beverage, in particular a beverage dispensed from a vending machine.

Further the invention provides a method for the production of skimmed milk powder comprising the steps of concentrating the skimmed or semi-skimmed milk to up to 45 to 58% total solids, spray-drying the concentrate in a drying tower to obtain a powder having a water activity between 0.15 and 0.7 and heating the powder at a temperature between 25 and 55° C., above glass transition temperature of the powder for 10 minutes to 6 hours. Most preferably, the desired reaction of glycation can be accelerated and produced in less than 60 minutes by heating the powder between 30° C. and 45° C. above the glass transition of the powder. Preferably the resulting product is cooled and/or dried. This simple and low-cost method results in a skimmed milk powder with improved flow properties and/or improved solubility in cold water as compared to skimmed milk powder produced by other methods.

DETAILED DESCRIPTION OF THE PREFERRED EMBODIMENTS

The invention lies in the fact that the flow properties and/or the solubility at room temperature of milk powder can be increased by a controlled crystallization of the lactose in the powder. The resulting powders that contain crystallized lactose can be used in the same way as the usual powder. During treatment of the powder to induce lactose crystallization, condensation of the proteins in the powder with lactose may also occur. This is the first step of the well-known Maillard reaction (glycation) and results in the production of lactosylated proteins.

The Maillard reaction is one of the major modifications of milk proteins subjected to processing (heat treatments, concentration, drying) and storage. The Maillard reaction is a complex set of reactions that takes place between amines, usually from proteins and carbonyl compounds, generally sugars, especially glucose, fructose, maltose or lactose. The initial step (early Maillard reaction or glycation) involves the reaction between a reducing sugar and a primary amino acid. Loss of water from this molecule produces an imine that is able to cyclize, resulting in the formation of an N-glycoside (a sugar attached to an $NR_2$ group). The alpha and beta anomers of N-glycoside exist in equilibrium (mutarotation) as a result of an acid catalyzed summarization. This proceeds via an open chain, immonium ion. Instead of cyclization of the immonium ion, an Amadori rearrangement may take place: this is an alkali catalyzed summarization reaction. Oxidative cleavage of Amadori products gives a useful indication as to the extent of the Maillard reaction.

Glycosylamines and Amadori products are intermediates formed during the course of the Maillard reaction. The concentration of these intermediates depends upon the reaction conditions (pH, temperature and time) and they will ultimately have an impact on the color, taste and odor of food since they will be involved in the formation of other products.

In some cases, the Maillard reaction might be undesirable and therefore carefully controlled during processing and storage. However, the Maillard reaction can also be exploited via processing parameters to achieve specific goals such as aroma generation.

In milk and dairy products, lactosylation is the first step of the Maillard reaction (early Maillard reaction or glycation), which involves the condensation of the α-hydroxy carbonyl group of lactose (glucose moiety) with protein amino groups (mainly lysine residues and N-term amino-acids). A reversible Schiff base is formed, which subsequently rearranges to produce a more stable ketoamine (Amadori compound). The powder according to our invention is processed until it reaches this early Maillard reaction step, it being understood that the early Maillard reaction can be stopped at any time by cooling down and/or by drying the powder.

The starting materials of the invention are usual milk powders, such as skimmed milk powder, semi-skimmed milk powder, milk protein concentrate and buttermilk powder. These are commercially available. Such powders may contain from 28 to 60% protein, and from 60 to 25% lactose, as well as minerals and traces of other elements. Usually, the lactose is present in an amorphous state in such powders.

The main protein constituents in milk powders are the milk protein casein (CN) and the two major whey proteins: β-lactoglobulin (β-LG, with two variants A and B) and α-lactalbumin (α-LA). The terminal α-amino-acid and the ε-$NH_2$ of lysine residues are known to be the potentially primary sites of lactose attachment in the protein backbone. Based on their respective sequence, the lysine content of the various milk proteins is reported in table 1 below.

TABLE 1

Lysine content of various milk proteins.

| | Protein | | | | | |
|---|---|---|---|---|---|---|
| | $α_{S1}$-CN | $α_{S2}$-CN | β-CN | κ-CN | β-LG | α-LA |
| Molecular weight | 23 kDa | 25 kDa | 24 kDa | 19 kDa | 18 kDa | 14 kDa |
| Number of Lys | 14 | 24 | 11 | 9 | 15 | 12 |
| Lysine % (w/w) | 7.6% | 12.2% | 5.9% | 6.1% | 10.5% | 10.9% |

According to the invention a lactose crystallization process is applied to milk powders. This process is a heat treatment (50-110° C.) of protein/sugar powders with an adjusted $A_W$ (0.150.7). Preferably the process is carried out as a solid-state process. The overall process is very simple, well adapted to the existing industrial equipment and has a low-energy cost.

The overall process comprises the following steps:
(a) water activity adjustment (and equilibration of the $A_W$ of the powders);
(b) heat treatment of the humidified powder; and optionally
(c) cooling down and/or drying of the powder.

This process also results in the glycation of proteins in the milk powder. Compared to published procedures for modifying the proteins through early Maillard reaction, the process of the invention is much faster: it is a matter of hours or even minutes versus days. Furthermore, the powders processed according to our invention stay in powder form whereas powders processed according to other known techniques become sticky or pasty, and therefore are not easily processable.

The first step (i.e. water activity adjustment) is ideally obtained directly during the manufacture of the milk powder through spray drying by adjusting the drying parameters and by avoiding the use of after-dryers. The preferred $A_W$ of powders is between 0.15 and 0.7, more preferably between 0.2 and 0.3. Trials performed have shown that this procedure could lead to powders having $A_W$ 0.3 to $A_W$ 0.4, and 0.5 as a maximum. There are some technological limitations for producing powders with higher $A_W$ values, since high moisture powders can cause stickiness and caking in the drying tower.

Water absorption and equilibrium can be achieved more quickly by any other known technique, such as for example by using dynamic injection of humidified air in the powder or by placing the powder in a chamber with controlled temperature and relative humidity of air.

It is also possible to adjust $A_W$ by placing the powders in a closed chamber with saturated salts, for example. Salts such as $MgCl_2$ (for max. $A_W$=0.33), $K_2CO_3$ (for max. $A_W$=0.44) and $MgNO_3$ (for max. $A_W$=0.53) may be used. $A_W$ and water uptake have to be monitored during this phase. When the required $A_W$ is reached the powders can be collected, for example in sealed opaque bags, such as aluminum bags. The powders can be then stored, preferably at least for 24 hours, in these sealed bags for equilibration of water within the matrix. $A_W$ is then controlled once more before further treatment of the powders.

The second step is a heat treatment of the powder. This may be applied, for example, by batch heat treatment or in-line heat treatment of powder in a sealed reactor operated in static or dynamic conditions. Devices such as post-dryers, pulsed-air chambers or fluidized beds, can be used with slight modifications if continuous processing is desired.

The applied heat treatment is preferably a mild heating over a period ranging from several minutes to several hours. The temperature is chosen such that the lower limit is high enough to allow the reaction to proceed at a reasonable rate and the upper limit is low enough to avoid protein denaturation and advanced Maillard reaction (characterized by a browning color of powders comprising proteins). In particular, the temperature can be between 50 and 110° C., more preferably 75 to 95° C., and in a preferred embodiment is 80° C. The heating time is between 10 minutes and 6 hours, preferably less than 120 minutes, more preferably between 20 and 60 minutes.

A third optional step is the cooling down and/or drying of the powder after the heating step. This step allows the early Maillard reaction to be stopped at any time by cooling down and/or by drying the powder and helps to stabilize the powder for storage. This technique is commonly used in conventional powder processing.

The aim of this two- or three-step treatment is to obtain a degree of crystallization of lactose in the powder between 10 and 50%. The extent of crystallization (% CR) can be measured by Gas Capillary Chromatography as described by P. Würsch et al. (Milchwissenschaft (1984) 39(10), 579-582), and the appearance and abundance of lactose crystals can be monitored by a simple microscopic analysis using polarized light. Alternatively the extent of crystallization can be monitored in conjunction with the extent of protein glycation, for example chemical monitoring by furosine determination (amino acid analysis) and by LC-ESIMS (Liquid Chromatography Electro Spray Ionisation Mass Spectrometry). Both methods are used to calculate the glycation extent, which corresponds to the ratio of lactosylated sites over total potential reactive sites (lysine and terminal amino acid).

Figure 1:
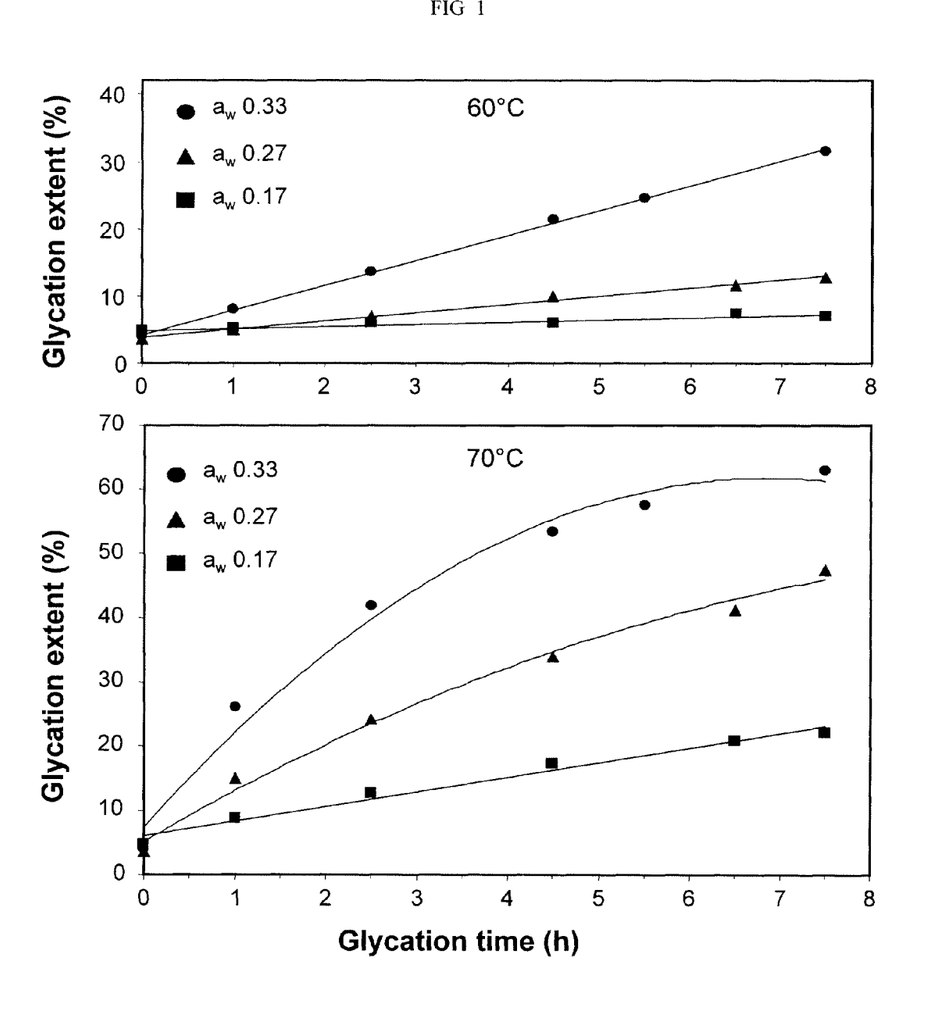
FIG. 1 shows the monitoring of protein glycation during the solid-state treatment of skimmed milk powder at 60° C. and 70° C.

FIG. 1 shows the glycation kinetics of standard skimmed milk powder heated at 60° C. and 70° C. degree for 3 initial $A_W$. The level of glycation, expressed by the percentage of blocked lysine, was determined according to the furosine analysis by amino acid analyser. Samples were analysed in duplicate following the method described in Finot et al. (1981): *The extent of Maillard reaction during the processing of milk*. Prog Food Nutr Sci 5, 345. Initial $A_W$ played a major role in the glycation rate. For instance, powder adjusted to an initial $A_W$ of 0.17 showed a glycation extent of about 7% after 7.5 hours of treatment at 60° C., whereas powder adjusted to an initial $A_W$ of 0.33 showed glycation extent of about 32% after the same treatment. Furthermore the temperature used for the solid-state glycation affected the glycation rate and extent. For instance, at initial $A_W$ 0.27, the glycation extents were 12.8% and 47.5% after 7.5 hours of treatment at 60 and 70° C. respectively. Moreover, the glycation kinetics seemed to differ according to the temperature: at 60° C., glycation rates were linear during the incubation period, whereas at 70° C., non-linear curves were obtained.

Figure 2:
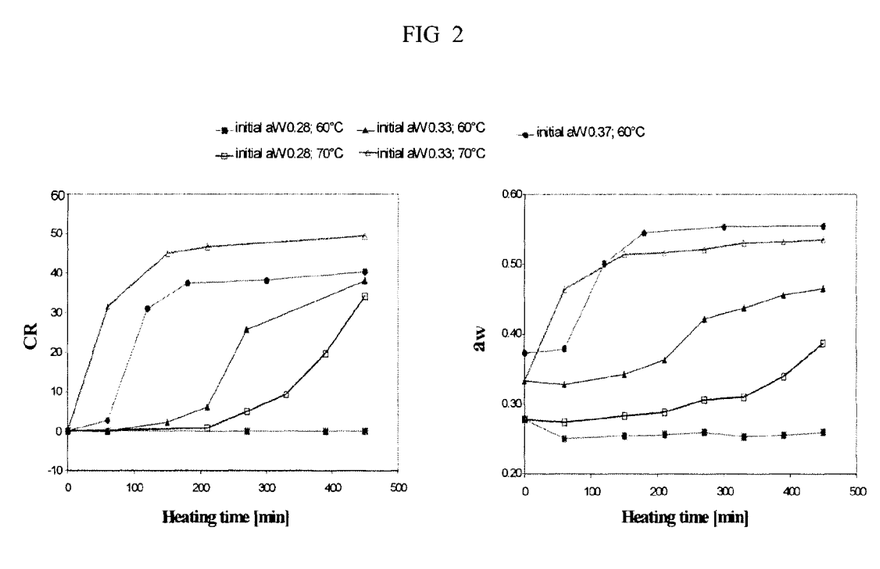
FIG. 2 shows the evolution of lactose crystallization (CR %) and $A_W$ during solid-state heat treatment of skimmed milk powder for three levels of initial $A_W$ at 60 and 70° C.

FIG. 2 shows the evolution of $A_W$ and degree of lactose crystallization in treated skimmed milk powders, at various $A_W$ and at 60 and 70° C. The degree of lactose crystallization (% CR) was comprised between 0 and 50% as measured with the Gas Capillary Chromatography method.

The % CR can be easily controlled by selecting the processing conditions. For instance, a milk powder with 30% lactose crystallization can be obtained either after a treatment at 70° C. for 1 h with an initial $A_W$ of 0.33, or after a treatment at 60° C. for 2 hours with an initial $A_W$ of 0.37.

There is a clear correlation between the extent of lactose crystallization and the evolution of $A_W$ of SMP. The two phenomena are linked since water is released upon lactose crystallization. The water arising from lactose crystallization remains in the matrix (sealed tubes) and increases the overall $A_W$ of the system. Although the $A_W$ of SMP increased during the heat treatment and under specific process conditions of temperature and initial $A_W$, the water content did not change (heat treatment in a closed system). If part or totality of the heat treatment is conducted in an open system, a decrease is $A_W$ will occur, due to water losses (drying).

In further experiments, standard skimmed milk powder was subjected to a humidification process followed by a low temperature heat treatment according to the invention. The processing conditions ($A_W$ and heating time) were varied in order to optimize powder flowability and dissolution. The humidification increased the powder water activity ($A_W$) that lead to a reduced glass transition temperature (Tg). This step was to facilitate the glassy to rubbery state transition of the powder during heat treatment. The powder was then heat treated at 60° C., which induced lactose crystallization. During these physical changes, the early Maillard reaction (glycation) was also triggered. Both the physical and chemical modifications can be terminated at any time by just drying and cooling the powder down.

Powder flowability, dissolution and sensory analysis at about 20° C. (including 10° C. for dissolution) of the treated and untreated samples were assessed.

Methods:

Skimmed milk powder (SMP) of standard composition supplied by the Konolfingen Nestlé factory was humidified in a climatic chamber type CTS 10/200 at two levels of water content:

RH=34% @25° C., and
RH=38% @25° C.

The increase of $A_W$ results in lowering of the Tg and consequently an increase in T–Tg. The humidified powder was heated at 60° C. in a dynamic and closed reactor type, Lödige M20R at several durations ranging from 2 to 6 hours. Then, the heating device was left open for 1 hour at 60° C., which resulted in a loss of water and a decrease of $A_W$ (drying). Finally, the SMP was stabilized by cooling down to room temperature and gently sieved to remove large lumps (0.5 mm). The treated samples were stored in sealed aluminum bags at temperatures below 15° C. to avoid further physicochemical changes.

Three variants of treated powder were produced as shown in Table 2 below with the goal of limiting the extent of lactose crystallization to 50% or less, and the extent of blocked lysine to 30% or less.

TABLE 2

Heat treatment conditions of humidified SMP.

| Code sample | Initial $A_W$ @ 25° C. | Final $A_W$ @ 25° C. | Heating time @ 60° C. [hour] |
|---|---|---|---|
| Treated SMP N° 2728 | 0.383 | 0.240 | 2 |
| Treated SMP N° 2930 | 0.373 | 0.246 | 4 |
| Treated SMP N° 3132 | 0.332 | 0.165 | 6 |
| Untreated SMP | — | — | 0 |

Physical and Chemical Characterization:

Water activity ($A_W$) was measured at 25° C. using a hygroscope model DT instrument (Rotronic, Bassersdorf, Germany). All $A_W$ data were corrected using a quadratic equation obtained from five standard saturated salts ($A_W$: 0.111, 0.225, 0.328, 0.432 and 0.529).

Tg and the delay of lactose crystallization in SMP were measured by differential scanning calorimetry using a Micro-DSC III from the company Seteram (Caluire France) at 0.1° C. min$^{-1}$ using the standard ASTM E1356-98.

The level of glycation, expressed by the percentage of blocked lysine, was determined according to the furosine analysis by amino acid analyser. Samples were analysed in duplicate following the method described in Finot et al. (1981): *The extent of Maillard reaction during the processing of milk*. Prog Food Nutr Sci 5, 345. Lysine and furosine in acid hydrolysate were separated by cation exchange chromatography and quantified after derivatisation with ninhydrin and spectrophotometric detection.

Presence and abundance of lactose crystals was determined by direct microscopic observation of the powders with a binocular system under polarized light.

Powder tap density was measured by jolting the powder on a fixed volume jolting volumeter STAV 2003 to shake it down then weighing the amount of powder occupying the said fixed volume and calculating the density accordingly.

Skeletal density was measured using a helium pycnometer (Accupyc 1330 from Micromeritics).

Particle size analysis was performed using the Sympatec instrument with the Gradis dispersing system.

The microstructure evaluation was investigated by scanning electron microscopy (SEM) in order to show physical changes of particle structure during the heat treatment of SMP.

A sensory session was organized with an internal panel (6 people) in order to evaluate the sensory impact of the process on milk powder. Heat-treated samples were compared with the untreated SMP both as a creamer in coffee beverage (4.2 g/100 ml) and as reconstituted milk (10% w/w in water). The panel verified the flavor and taste, as well as their type and intensity.

Powder Flowability:

The milk powder flowability was expressed through the angle of repose and by the canister emptying capacity.

Angle of repose was measured by determining the angle of the cone formed by the powder flowing onto a surface. The powder is allowed to flow naturally from a funnel onto a flat cylindrical surface of known diameter. The funnel is half filled with powder with the exit blocked and positioned above the flat surface with the stem of the funnel in line with the axis of the cylinder. The funnel is opened and the powder allowed to flow out. If necessary the powder is stirred to encourage it to leave the cylinder. The powder will naturally collect on the surface of the cylinder forming the shape of a cone. After ensuring that the powder covers the surface of the cylinder, the distance between the apex of the cone and the surface on which the cylinder rests (e.g. a lab bench or table) is measured and height of the cone is obtained by subtracting the thickness of the cylinder from the measured height. The angle of repose, being the base angle of the cone formed by the powder, is calculated from the height of the cone as measured and the radius of the cone (which is equal to the radius of the cylindrical surface). The smaller the angle, the better is the powder flowability. In general, free flowing powders have an angle of repose of 40° or less whilst problems of flowability are likely to be encountered with powders having an angle of repose of 50° or more (ISO 4324).

The canister emptying capacity measures the behavior of a powder dispensed in a canister to simulate of vending machine conditions. Dosing consistency is assessed by 3 main parameters:
  the standard deviation.
  the % of doses In/Out of specification.
  the amount of powder remaining in the canister when the powder does not flow any more.

The canister used was the Rhea Lioness equipped with a wheel.

Powder Dissolution and Reconstitution:

The ability of milk powder to be dispersed and solubilized in water was determined by two measurements: "reconstitution speed" and "dissolution speed". The different kinetics were measured by adding 10 g of milk powder to 400 ml of deionized water at a given temperature and recording the increase of the conductivity with time. This increase is correlated with the % of dissolved powder through a specific calibration. The difference between the "reconstitution" and "dissolution" experiments relies on the different stirring efficiency:

The "reconstitution speed" is obtained with both
  a magnetic stirrer (250 rpm) at the bottom of the vessel, and
  a propeller rotor (2 blade, 60 rpm) running in the middle of the liquid.

This combination allows a gentle dispersion of the powder into the liquid, allowing both the wettability and the dissolution to affect the observed kinetics.

The "dissolution speed" is obtained by
  increasing the rotation speed of the magnetic stirrer to 500 rpm, and
  using a different propeller rotor (6 blade, 100 rpm) at the surface of the beaker (slightly eccentric).

These modifications force the powder to be dispersed rapidly and the observed kinetics is thus mainly due to the dissolution and no longer to the wettability of the powder.

Preliminary experiments were carried out both with cold water at 10° C. and 20° C. ("Cold water" in the context of the invention is considered at a temperature of between 6 and 20° C.). However, as no differences were observed in reconstitution and dissolution speed between the two temperatures, all further experiments were only performed at 20° C.

Results and Discussion:

The results are summarized in the table 3 below:

TABLE 3

Heat treatment condition of humidified SMP and resulting effects on lactose crystallization and blocked lysine.

| Code sample | Initial $A_W$ @ 25° C. | Final $A_W$ @ 25° C. | Heating time @ 60° C. [hour] | T – Tg [° C.] (60° C.) | Delay Lactose cryst. [hour] | Lactose cryst. Microscopic examination | Blocked Lysine [%] |
|---|---|---|---|---|---|---|---|
| Treated SMP N° 2728 | 0.383 | 0.240 | 2 | 32.9 | 1.7 | strong crystallization | 15.54 |
| Treated SMP N° 2930 | 0.373 | 0.246 | 4 | 31.5 | 2.1 | strong crystallization | 21.65 |
| Treated SMP N° 3132 | 0.332 | 0.165 | 6 | 25.7 | 5.3 | strong crystallization | 19.80 |
| Untreated SMP | — | — | 0 | — | — | no crystallization | 4.00 |

Crystallization Level:

Each of the three treated samples showed strong lactose crystallization. These samples had high glycation levels of 15.5, 19.8 and 21.6% of blocked lysine. The level of glycation is correlated with T–Tg and the duration of heating.

Crystallization of lactose is a phenomenon which is not generally desirable in powders, because it releases water molecules and therefore decreases the shelf-life of said powders (lipid oxidation for instance) and may render them unable to be processed (stickiness, caking phenomenon). In whole milk powders containing a relatively high amount of fat, solid-state treatment will lead to release of fat and no improvement of flowability would be expected. Surprisingly, lactose crystallization did not occur during the processing at 60° C. of Whey Protein Concentrates (WPCs) (whether with 35, 60 or 80% protein) with an initial $A_W$ between 0.2 and 0.6. NIR spectra (Near Infra Red Reflectance Spectrum) or GCC (Gas Capillary Chromatography) analysis did not show any crystallization event in WPC. As a consequence, the $A_W$ did not change during the heat treatment at 60° C. This behavior is remarkable and completely unexpected, and it is thought that presence of the whey proteins inhibited lactose crystallization.

In contrast, the skimmed milk powders treated in this experiment showed strong lactose crystallization. The crystallization rate appears to be dependent on initial $A_W$ and heating temperature. Surprisingly, the crystallization did not have the expected effects. Instead the modified powders showed increased solubility and improved flow properties as compared to the untreated powders, as discussed below.

TABLE 4

Lactose crystallization in WPC and SMP.

| Criterion | Whey protein concentrate | Skim milk powder |
|---|---|---|
| Tg (temp. of glass transition) | No significant differences between WPC and SMP | |
| Lactose crystallization | No crystallization during the overall solid-state glycation process | Crystallization starts after 4 h at 60° C. (initial $A_W$ 0.33) starts without delay at 70° C. (initial $A_W$ 0.33) induces an increase of $A_W$ |
| Evolution of $A_W$ | $A_W$ stable during solid-state glycation at 60° C. | $A_W$ increases in parallel with lactose crystallization |
| Browning | Not perceptible with the naked eye | Browning starts after 3 h at 70° C. for SMP with initial $A_W$ = 0.33 |

Particle Size Distribution:

All treated powders were pretty homogeneous. The range of ×50% data was between 148 and 155 μm. Particle size (×50%) of untreated SMP was measured at 171 μm.

Tap Density:

Samples No. 2728 and 2930 (high T−Tg difference) exhibit a slightly higher tap density than the other samples as shown in Table 5 below. This may be correlated to the smaller granulometry of these 2 powders.

Skeletal Density:

Samples No. 2728 and 2930 (high T−Tg difference) exhibit a higher skeletal density, probably due to the higher "open porosity and cracks" induced by lactose crystallization (a high skeletal density corresponds to a lower closed porosity and is thus perfectly in-line with the SEM pictures and higher solubility).

TABLE 5

Particle size analysis and powder density of untreated and heat-treated SMP

| | Particle size | | | Powder density | |
|---|---|---|---|---|---|
| Code sample | ×10 [μm] | ×50 [μm] | ×90 [μm] | Tap density [g/cm³] | Skeletal density [g/cm³] |
| Treated SMP N° 2728 | 67.52 | 148.10 | 289.32 | 0.66 | 1.417 |
| Treated SMP N° 2930 | 70.70 | 152.73 | 296.14 | 0.66 | 1.382 |
| Treated SMP N° 3132 | 74.73 | 157.79 | 299.59 | 0.62 | 1.333 |
| Untreated SMP | 79.10 | 171.52 | 334.11 | 0.61 | 1.330 |

Figure 6:
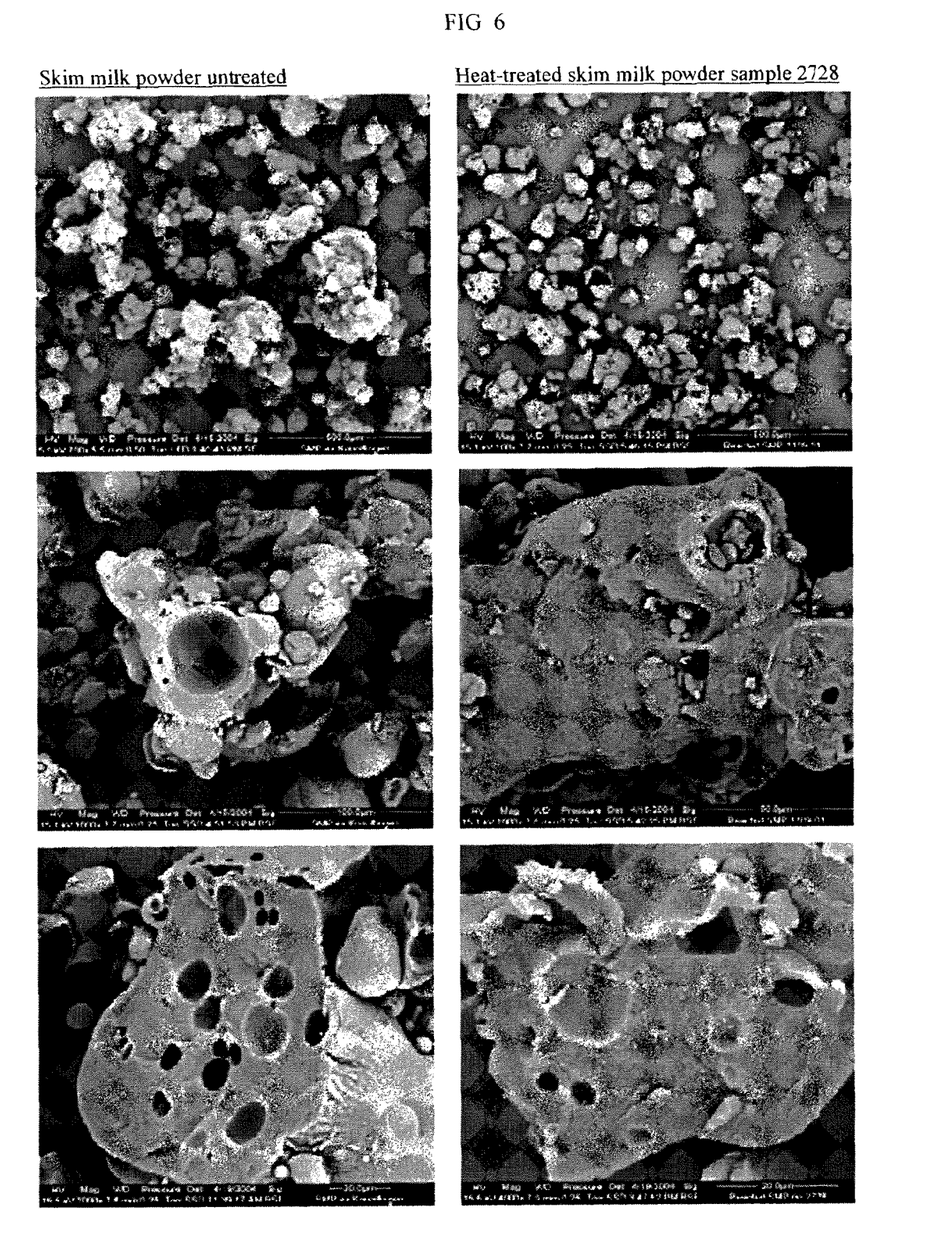
FIG. 6 shows SEM image analysis of the evolution of the microstructure of modified and unmodified skimmed milk powder induced by the heat treatment.

SEM:

The SEM image analysis shows the evolution of the microstructure induced by the heat treatment (see images in FIG. 6). First, the treated SMP is organized in small spherical particles and less agglomerated than the untreated powder. The surface of the treated powder also has a rougher surface (due to the presence of lactose crystals) with evidence of open micropores and micro-cracks in the powder particles.

Sensory Analysis:

The sensory analysis of treated and untreated SMP did not show obvious differences. Higher glycated samples No. 2930 and 3132 were described as more aqueous, slightly more nutty, less white and bitter in the coffee. As reconstituted milk, these samples were found slight metallic with more caramel and sweet tones. Generally, the process does not affect the taste and the flavor perception. Further, no browning was observed with the naked eye in any of the samples during the process.

Powder Flowability:

The powder flowability was determined by the angle of repose and by the canister emptying capacity. The results are shown in Table 6.

TABLE 6

Powder flowability for treated and untreated SMP

| | Angle of repose | | Canister Rhea Lioness | | | |
|---|---|---|---|---|---|---|
| Code sample | Angle [°] | Observation | StDev [%] | Within Spec | Out of Spec | Remain in canister[%] |
| Treated SMP N° 2728 | 39 | Flows well | 3.3 | 63.1 | 33 | 3 |
| Treated SMP N° 2930 | 39 | Flows well | 3.7 | 55.5 | 35 | 4 |
| Treated SMP N° 3132 | 38 | Flows well | 5.8 | 34.7 | 54 | 43 |
| Untreated SMP | 52 | Flows badly | 8.5 | 24.8 | 59 | 43 |

The powders No. 2728 and 2930 (higher T–Tg) were clearly more free flowing in the canister than the three other samples. Over 55% of dispensed powder was within the dose specification and only 3-4% of milk powder remained in the canister.

The powder No. 3132 (low T–Tg with long heating) showed a good angle of repose but a rather poor behavior in the canister. This situation happens when a powder is flowing but exhibits a negative compaction behavior.

In contrast, the untreated SMP flowed poorly with an angle value of 52°. In the canister, only ~25% of the powder was dispensed within the specification and 43% of the SMP remained in the box when the flow stopped.

Figure 3:
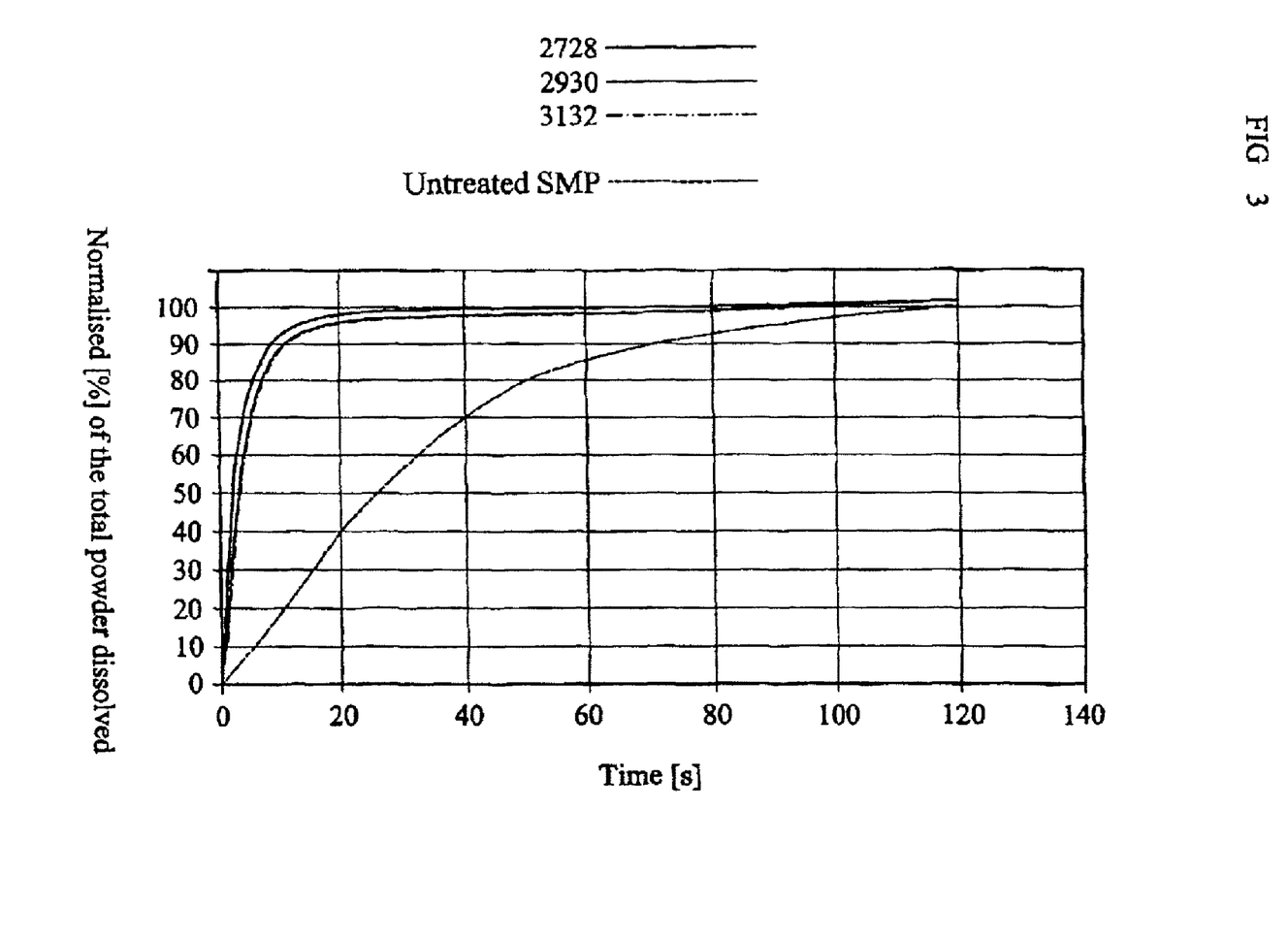
FIG. 3 shows the dissolution speed in water at 20° C. of modified and unmodified skimmed milk powders.
Figure 4:
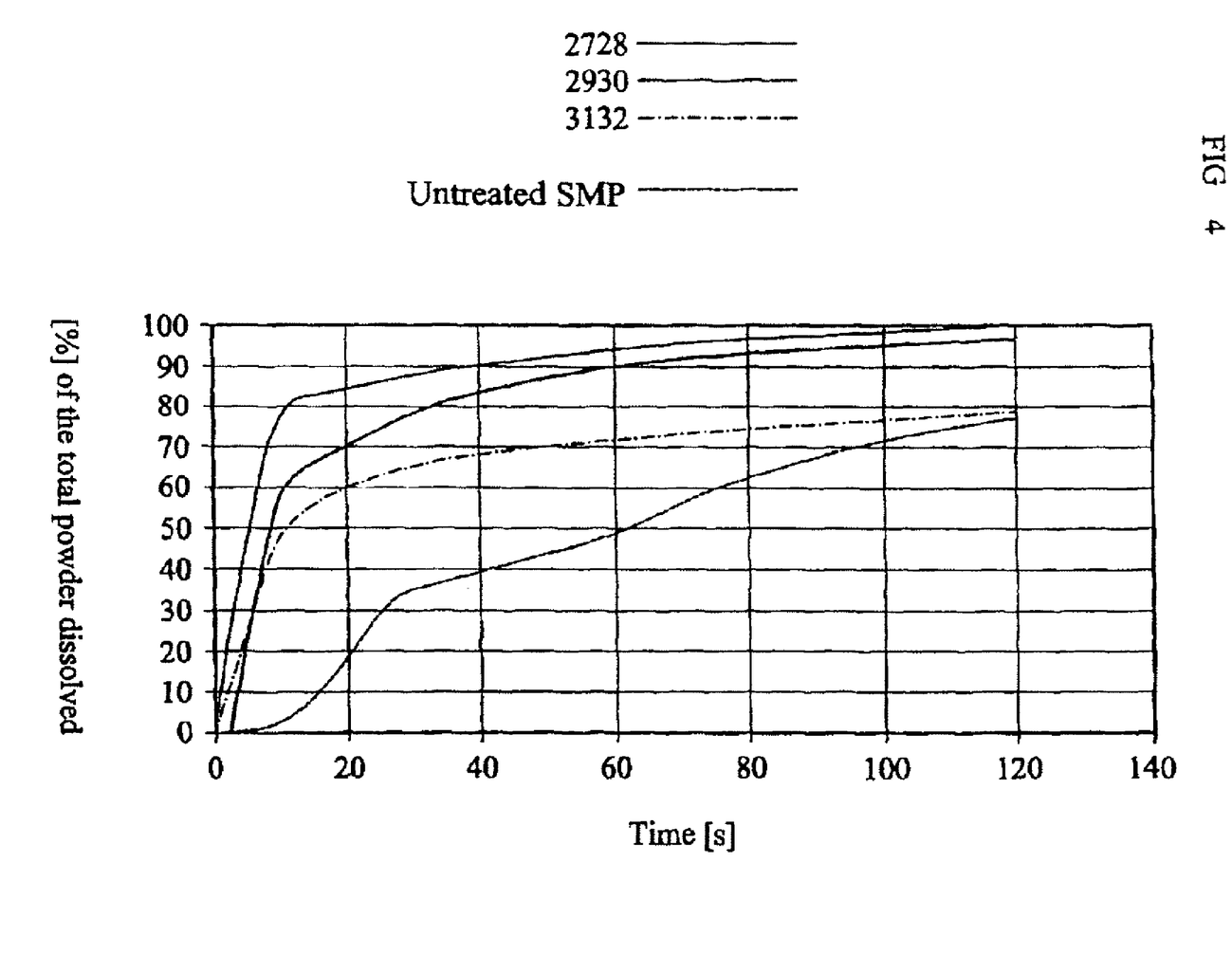
FIG. 4 shows the reconstitution speed in water at 20° C. of modified and unmodified skimmed milk powders.
Figure 5:
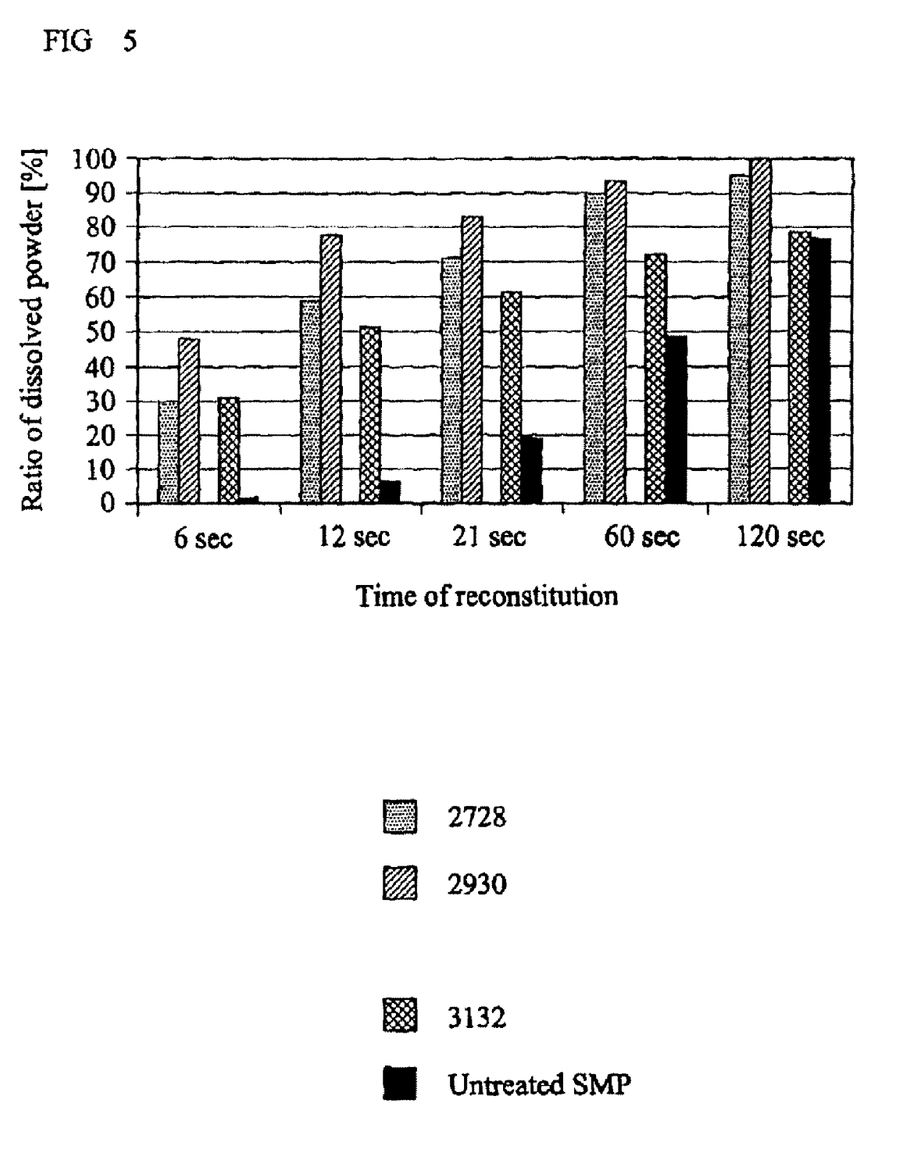
FIG. 5 shows the reconstitution level in cold water at 20° C. of modified and unmodified skimmed milk powders at several times of reconstitution.

Powder Dissolution and Reconstitution:

Two aspects of these measurements were taken into account. The first indication, the kinetics, illustrates the rapidity of the phenomena. The second indication was the maximum level of powder dissolution after 2 minutes. The results are shown in FIGS. 3-5.

Dissolution Kinetics:

The measurement of the dissolution kinetics allows classification of the samples into two groups.
1. Samples No. 2728, 2930 and 3132 showed a fast dissolution.
2. Untreated SMP showed a slow dissolution.
The method however, did not discriminate between the samples that flowed well (FIG. 3). Note also that these same three powders showed a very good free flowing performance and a high crystallization degree, in contrast to the untreated SMP.

Reconstitution Speed:

The reconstitution speed is more discriminant (FIG. 4).
1. Sample No. 2930 (high T–Tg, long heating) shows the best reconstitution performance.
2. Sample No. 2728 (high T–Tg, short heating) shows a slightly slower kinetics but close to No. 2930.
3. Sample No. 3132 (low T–Tg, long heating) started the dissolution with the same profile as the first two, but then slowed down to reach a maximum of only 78% of reconstitution after 2 minutes.
4. The untreated SMP shows slower reconstitution kinetics compared to the three treated powders and reaches a maximum of 76% of reconstitution after 2 minutes.
To complete the analysis of the reconstitution profile, the ratio of dissolved powder [%] was expressed after 6, 12, 21, 60 and 120 seconds (FIG. 5 and Table 7). This gives an indication on the extent of reconstitution at five time points.

TABLE 7

Ratio of SMP reconstitution in cold water at 20° C. at five time points.

| | Recons. Time | | | | |
|---|---|---|---|---|---|
| Code sample | 6 sec | 12 sec | 21 sec | 60 sec | 120 sec |
| Treated SMP N° 2728 | 30.1 | 59.2 | 71.2 | 89.4 | 96.1 |
| Treated SMP N° 2930 | 46.9 | 77.4 | 83.9 | 94.4 | 100.0 |
| Treated SMP N° 3132 | 30.7 | 52.8 | 60.9 | 72.6 | 78.8 |
| Untreated SMP | 1.4 | 6.4 | 19.2 | 49.0 | 76.7 |

Mild heat treatment of milk powders adjusted to a certain $A_W$ clearly improves the flowability and cold dissolution of the powder. This improvement appears to be primarily due to T–Tg (the difference between the treatment temperature and the glass transition temperature) and secondly due to the duration of the heating process. In the case of SMP, the humidification and heat treatment processes drastically changed the microstructure. Particles of treated powders were of smaller size and had a rough surface with micropores. The surface roughness, along with the micropores, was probably induced by the crystallized lactose. The processes also induced glycation of milk protein in the range of 10 to 30% of blocked lysine.

The modified powders may be used in the same way as the usual powders. For example, they can be used as an ingredient in liquid beverages. In particular, because of the improved flowability and solubility the modified powders are suited to use in dry beverage formulations, in particular those which are dispensed from vending machines or the like. Other such liquid formulas include, for example, infant formulas, nutritional compositions for elderly people or for patients having special nutritional requirements, for example people being under or recovering from chemotherapy or radiotherapy, or people having decreased intestinal absorption functions. The glycated proteins can be subjected to UHT treatments or other heat treatments without being damaged, thus retaining their excellent nutritional properties and amino acid profile.

Powders of the invention can also be used, alone or together with other ingredients, as a powder to be reconstituted at home.

The overall process of the invention results in a powder with a degree of lactose crystallization between 10 and 50%, it being possible to process the powder at an industrial scale, either into powder or liquid formulations.

The above description illustrates some of the products and methods of making the same falling within the scope of the present invention. These products and methods are not to be considered in any way limitative of the invention. Changes and modifications can be made with respect to the invention. That is, the skilled person will recognize many variations in these examples to cover a wide range of formulas, ingredients, processing, and mixtures to rationally adjust the naturally occurring levels of the compounds of the invention for a variety of applications.

What is claimed is:

1. A method for improving solubility in cold water or improving flow properties of milk powder, which method comprises crystallizing lactose in the milk powder by the steps of:
   (a) adjusting the water activity of the powder to 0.15 to less than 0.3; and
   (b) heating the powder at a temperature of between 25° C. to 55° C. above the glass transition temperature of the powder for 10 minutes to less than 60 minutes to crystallize lactose in the milk powder and provide a modified milk powder having a degree of lactose crystallization of between 5 and 50% with the combined effect of steps (a) and (b) being such as to provide glycation of proteins in the range of 10-35% blocked lysine,
   wherein the powder is skimmed milk powder, semi-skimmed milk powder, milk protein concentrate or buttermilk powder, and
   wherein the modified milk powder also has an angle of repose in the powder flow test of less than 45° and improved solubility in water at 20° C. such that maximum powder dissolution after 2 minutes is greater than 95%.

2. The method as claimed in claim 1, wherein the water activity of the powder is adjusted to between 0.165 and 0.28; and the powder is heated to a temperature of between 30° C. to 45° C. above glass transition of the powder.

3. The method as claimed in claim 1 further comprising (c) cooling and/or drying the product of step (b) with the combined effect of steps (a), (b) and (c) being such as to provide a powder with improved solubility in cold water and improved flow properties as determined by a reduced angle of repose in a powder flow test, relative to the initial milk powder.

4. The method of claim 1 which further comprises providing the milk powder as a constituent of a liquid beverage, a dry beverage formulation or dry beverage mixes in a canister for dispensing from a vending machine.

5. The method of claim 1 which further comprises providing the modified milk powder in a foodstuff or beverage.

6. A modified milk powder produced by the method of claim 1.

7. A modified milk powder as claimed in claim 6 wherein the powder is skimmed milk powder, semi-skimmed milk powder, milk protein concentrate or buttermilk powder.

8. A modified milk powder as claimed in claim 6 which has improved flow properties such that (a) the angle of repose in a powder flow test is less than 40° or (b) less than 15% of the powder remains in a canister during a canister emptying test or (c) more than 50% of doses are within specification during a canister emptying test.

9. A container or canister of a beverage distribution machine containing therein the modified milk powder according to claim 6 as a constituent of a dry beverage formulation which is dosed from the container or canister of the beverage distribution machine.

10. The method of claim 1, wherein the powder is heated at a temperature of 50 to 110° C.

11. The method of claim 1, wherein the powder is heated at a temperature of 75 to 95° C.

12. A method for the production of skimmed or semi-skimmed milk powder which comprises concentrating skimmed or semi-skimmed milk to up to 45 to 58% total solids, spray-drying the concentrate in a drying tower to obtain a powder having a water activity between 0.15 and less than 0.3, and heating the powder at a temperature between 35° C. to 55° C. above the glass transition temperature ($T_g$) of the powder for 10 minutes to less than 60 minutes to crystallize lactose and form a modified milk powder that has an angle of repose in a powder flow test of less than 45° and improved solubility in water at 20° C. such that maximum powder dissolution after 2 minutes is greater than 95%, wherein the powder is skimmed milk powder, semi-skimmed milk powder, milk protein concentrate or buttermilk powder.

13. The method as claimed in claim 12 which further comprises cooling or drying the product after the heating step.

14. The method of claim 12 which further comprises providing the spray-dried milk powder as a constituent of a liquid beverage, a dry beverage formulation or dry beverage mixes in a canister for dispensing from a vending machine.

15. The method of claim 12 which further comprises providing the modified milk powder in a foodstuff or beverage.

16. The method of claim 12, wherein the water activity of the powder is adjusted to between 0.165 and 0.28 prior to heating.

17. The method of claim 12, wherein the powder is heated at a temperature of 50 to 110° C.

18. The method of claim 12, wherein the powder is heated at a temperature of 75 to 95° C.

* * * * *